US012232915B2

(12) United States Patent
Yao et al.

(10) Patent No.: US 12,232,915 B2
(45) Date of Patent: Feb. 25, 2025

(54) PERSONAL CARE SYSTEM, DEVICE, AND METHOD THEREOF

(71) Applicant: Colgate-Palmolive Company, New York, NY (US)

(72) Inventors: John Yao, Yangzhou (CN); Jiang Zhou, Yangzhou (CN)

(73) Assignee: Colgate-Palmolive Company, New York, NY (US)

( * ) Notice: Subject to any disclaimer, the term of this patent is extended or adjusted under 35 U.S.C. 154(b) by 584 days.

(21) Appl. No.: 17/469,355

(22) Filed: Sep. 8, 2021

(65) Prior Publication Data

US 2022/0160485 A1 May 26, 2022

Related U.S. Application Data

(60) Provisional application No. 63/117,078, filed on Nov. 23, 2020.

(51) Int. Cl.
*A61C 17/22* (2006.01)
*A61C 17/34* (2006.01)

(52) U.S. Cl.
CPC .......... *A61C 17/221* (2013.01); *A61C 17/225* (2013.01); *A61C 17/34* (2013.01)

(58) Field of Classification Search
CPC ..... A61C 17/221; A61C 17/225; A61C 17/34; G09B 19/0084; A46B 15/0002; A46B 2200/1066
See application file for complete search history.

(56) References Cited

U.S. PATENT DOCUMENTS

| 10,282,976 | B2 | 5/2019 | Pfenniger et al. | |
|---|---|---|---|---|
| 2010/0281636 | A1* | 11/2010 | Ortins | A46B 15/0006 15/4 |
| 2018/0132602 | A1 | 5/2018 | Gatzemeyer | |
| 2019/0167400 | A1 | 6/2019 | Barnes et al. | |
| 2020/0029680 | A1* | 1/2020 | Farrell | A46B 15/0044 |

(Continued)

FOREIGN PATENT DOCUMENTS

| CN | 104285216 | 1/2015 |
|---|---|---|
| CN | 106725957 | 5/2017 |

(Continued)

OTHER PUBLICATIONS

International Search Report and the Written Opinion of the International Searching Authority issued in International Application PCT/US2021/049521 mailed Dec. 13, 2021, pp. 1-9.

*Primary Examiner* — Phuong H Nguyen

(57) ABSTRACT

A personal care product (e.g., an electric toothbrush) may include a treating portion (e.g., cleaning elements) configured to clean one or more teeth of a user of the personal care product. The personal care product may include a handle used for gripping the personal care product. A communication interface may be configured to receive signals from one or more digital devices. The received signals may include a user profile. The user profile may include an identity (e.g., identity of the user profile) and/or instructions for operating the personal care product. A processor may be configured to receive the user profile from the communication interface. The processor may be configured to cause the personal care product to perform operations according to the instructions of the user profile.

20 Claims, 3 Drawing Sheets

(56) References Cited

U.S. PATENT DOCUMENTS

2020/0202131 A1* 6/2020 Norwood ............. G06K 7/1413
2020/0388374 A1* 12/2020 Kreuzer ............. G06Q 30/0201
2022/0331079 A1* 10/2022 Ogunsina ........... A46B 15/0006

FOREIGN PATENT DOCUMENTS

| CN | 107736944 | 2/2018 |
| CN | 305510087 | 12/2019 |
| CN | 305920968 | 7/2020 |
| KR | 10-2018-0116859 | 10/2018 |
| WO | 2013/007884 | 1/2013 |
| WO | 2015/061916 | 5/2015 |
| WO | 2016/020780 | 2/2016 |
| WO | 2016/082784 | 6/2016 |
| WO | 2018/196160 | 11/2018 |

* cited by examiner

PERSONAL CARE SYSTEM, DEVICE, AND METHOD THEREOF

CROSS-REFERENCE TO RELATED APPLICATION

This application claims the benefit of priority from U.S. Provisional Application No. 63/117,078, filed Nov. 23, 2020, the contents of which are hereby incorporated herein by reference in their entirety.

BACKGROUND

Personal care devices (e.g., oral care devices) that are powered, such as electric toothbrushes, are known. The powered personal care devices may be used to treat skin conditions, brush hair, eliminate food waste, etc. trapped between teeth, thereby preventing the occurrence of cavities and tooth disease. The personal care devices may have settings for use. What is desired is a powered personal care device that can be configured according to one or more external settings, such as settings associated with one or more other persons.

BRIEF SUMMARY

The present disclosure may be directed, in one aspect, to a personal care product, such as an electric toothbrush. The electric toothbrush may include a head portion having a plurality of cleaning elements configured to clean one or more teeth of a user of the electric toothbrush. The electric toothbrush may include a body portion used for gripping the electric toothbrush and a neck portion extending from the body portion. The neck portion may couple the head portion and the body portion. A communication interface may be configured to receive signals from one or more digital devices. The received signals may include a user profile. The user profile may include an identity (e.g., identity of the user profile) and/or instructions for operating the electric toothbrush. A processor may be configured to receive the user profile from the communication interface. The processor may be configured to cause the electric toothbrush to perform operations according to the instructions of the user profile.

In another aspect, a method of using a personal care product (e.g., an electric toothbrush) may include activating the personal care product based on an input provided by a user; providing user profiles comprising instructions for using the personal care product; receiving, via a user, a selection of a user profile of the user profiles; receiving, via a communication interface, digital information from one or more digital devices (e.g., the digital information including a user profile associated with use of the personal care product). The user profile may include an identity (e.g., identity of the user profile) and/or instructions for operating the personal care product. The personal care product may perform operations according to the received digital information relating to the selected user profile.

BRIEF DESCRIPTION OF THE DRAWINGS

The present disclosure will become more fully understood from the detailed description and the accompanying drawings, wherein.

DETAILED DESCRIPTION

Figure 1:
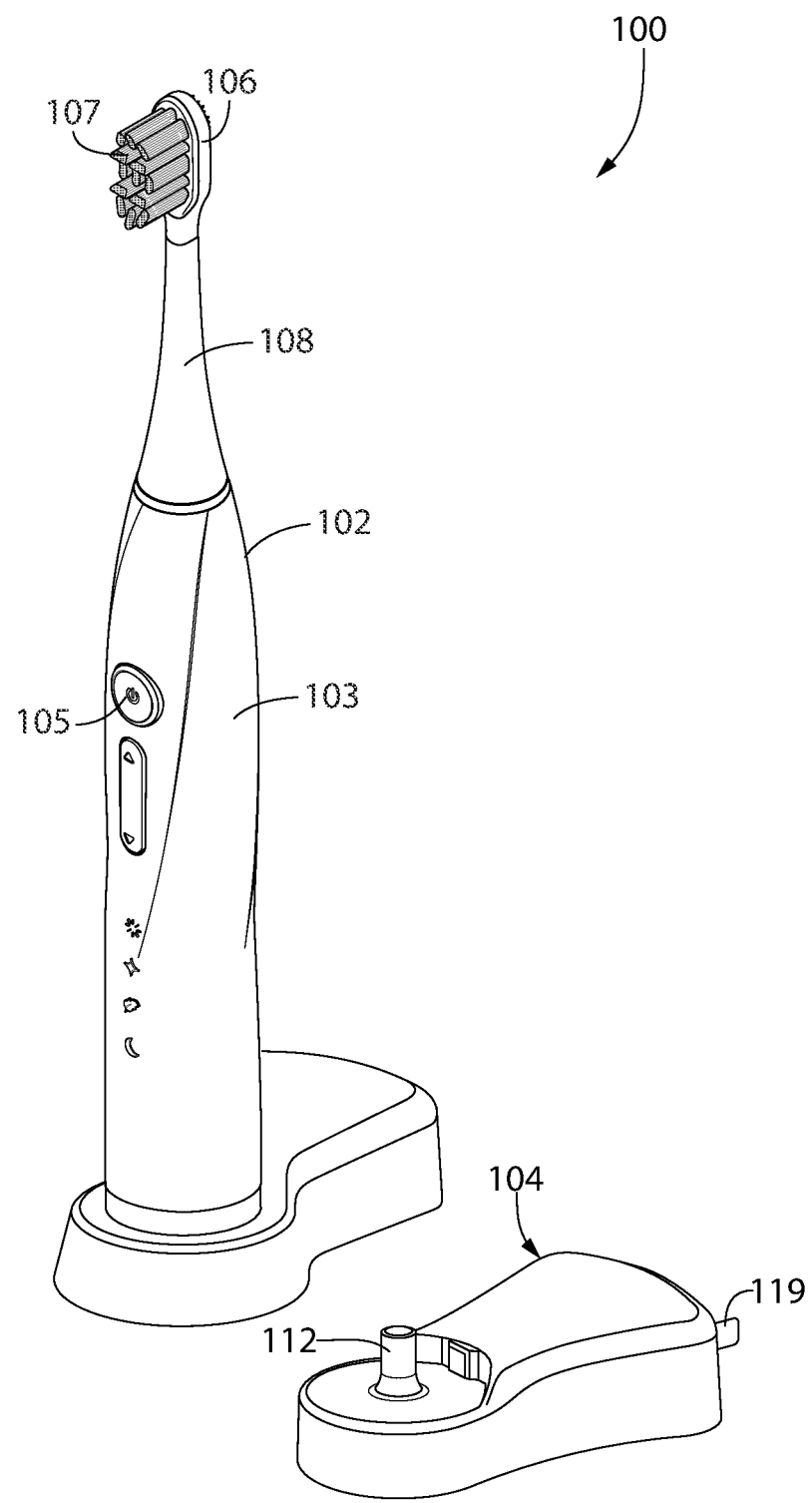
FIG. 1 is an example personal care product, as described herein.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Referring now to the figures, FIG. 1 shows a personal care system, such as an oral care system 100 including an electric toothbrush 102 and a charging device 104. Although the example shown on FIG. 1 includes an electric toothbrush 102, it should be understood that such example is for illustration purposes only. Examples may include any personal care product, such as a skin care device, hair care device (e.g., hair brush, razor), and the like. Although the example shown on FIG. 1 includes charging device 104, some examples may include a charging device while one or more other examples may not include a charging device.

As described herein, personal care product may include a toothbrush (such as electric toothbrush 102). Personal care product may include one or more portions, such as a body (e.g., handle) and/or a treatment portion. For example, electric toothbrush 102 may include a body 103 and a neck 108. Neck 108 may couple to the body 103 on one end and a brush head 106 on the other end. The brush head 106 may include one or more treatment portions, such as cleaning elements 107 for cleaning the teeth of a user of the electric toothbrush 102. Other personal care products may include one or more other treatment portions, such as bristles, blades, conditioners, etc. A user may manipulate (e.g., hold) the electric toothbrush 102 via the body 103. Actuator 105 may be used for switching the electric toothbrush on and off. Actuator 105 may be used for selecting user profiles, as described herein. For example, actuator 105 may be used for selecting a user profile of user of electric toothbrush 102, or a user other than the user of electric toothbrush 102. Actuator 105 may be arranged on the electric toothbrush 102, such as on body 103 of toothbrush 102. Charging device 104 may be connected (e.g., via cable 119) to a power source, such as an AC power source or DC power source. The charging device 104 may include a pin 112, via which the electric toothbrush 102 can be set upon and connected to the charging device 104.

Figure 2:
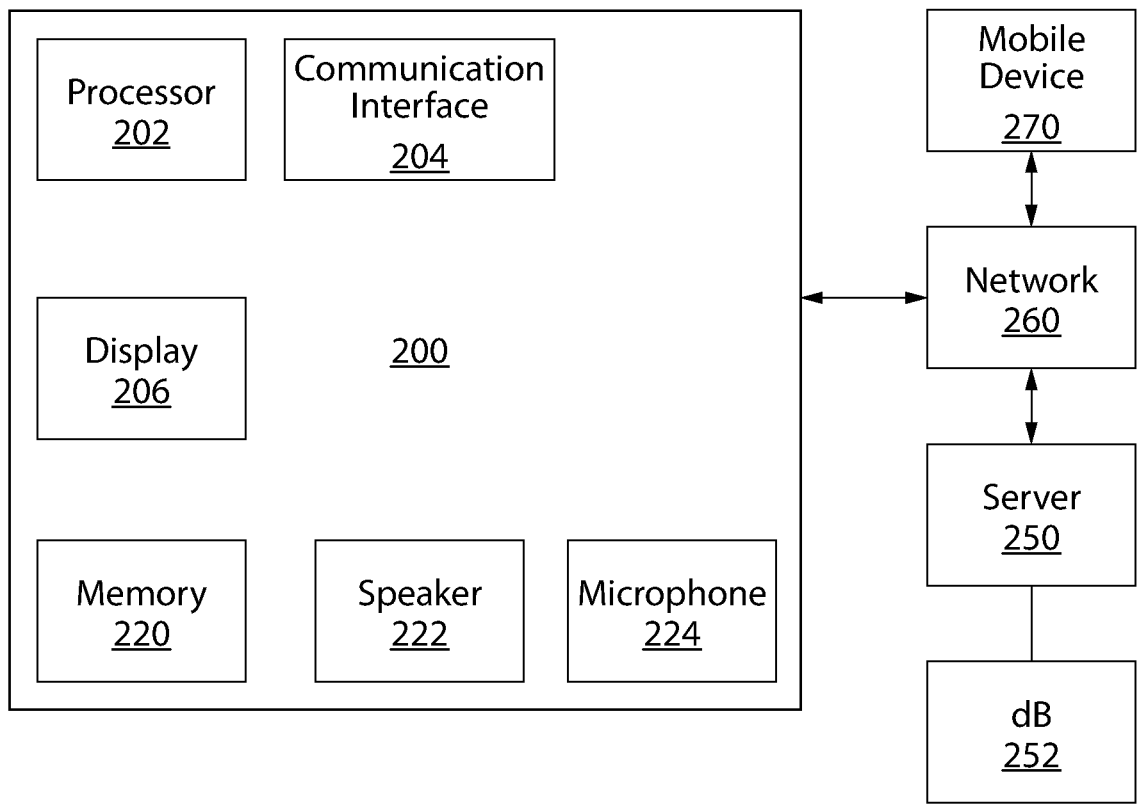
FIG. 2 is a block diagram of the example personal care product, as described herein.

FIG. 2 shows components forming oral care system 200. In some examples oral care system 200 may include electric toothbrush 102 (e.g., only electric toothbrush 102), and in other examples oral care system 200 may include electric toothbrush 102 and one or more other devices, such as charging device 104. Oral care system 200 may include a communication interface 204 that may permit the electric toothbrush 102 and/or charging device 104 to communicate with one or more devices, such as a remote server 250, mobile device 270, laptop, computer, and the like. Remote server 250 may include a database, such as database 252. Oral care system 200 may communicate with one or more devices to transmit information relating to a use of oral care system 200 and/or to receive information relating to a use of oral care system 200. For example, oral care system 200 may communicate with one or more devices to upload user profiles (including instructions for operating the electric toothbrush 102 according to the user profile) and/or to download user profiles.

As described herein, instructions may be performed by oral care system 200. For example, instructions may be performed by oral care system 200 for cleaning of the oral cavity. Such instructions may cause cleaning elements to move in predefined directions, speeds, and the like. For example, such instructions may cause cleaning elements to move at a predefined speed, direction to perform a daily cleaning, gentle cleaning (e.g., for sensitive teeth), a deep cleaning, a whitening, a gum cleaning, a tongue cleaning, and the like. The instructions may be associated with a setting, such as a user setting. The user of oral care system 200 may create and/or use one or more user settings. While one or more settings may be predetermined by the manufacturer of the oral care system 200, one or more additional settings may be created by the user of oral care system 200. For example, the user of oral care system 200 may determine which settings (e.g., portions of settings) work best for her oral care needs, and the user of oral care system 200 may choose the settings (e.g., portions of settings) accordingly.

The instructions relating to a setting may be performed by electric toothbrush 102 via a processor, such as processor 202. The processor 202 may include a central processing unit (CPU), which may be a programmable device or dedicated logic circuit or integrated circuit. The processor 202 may operate with a memory 220, which may be any type of recordable, computer-readable media. For example, memory 220 may be a static flash memory, dynamic memory, or any other type of electronic storage. The memory 220 may store instructions, such as the toothbrush settings described herein. In some examples, the processor 202 may be a general programmable device, and the memory 220 may store instructions that cause the processor 202 to perform the various functions described herein.

As described herein, oral care system 100 may include one or more communication interfaces 204 (e.g., one or more types of communication interfaces 204). For example, communication interface 204 may receive one or more signals that may include data that is indicative of the user profile. Similarly, the processor 202 may receive data from the communication interface 204 that may be indicative of the user profile. For example, communication interface 204 may be used to transmit signals and/or data to, or retrieve signals and/or data from, processor 202, network 260, and the like. In examples network 260 may be the Internet, although the network may be any network known by those of ordinary skill in the art, such as a local area network (LAN), wireless local area network (WLAN), personal area network (PAN), and the like.

Communication interface 204 may include a wired interface. Alternatively, or additionally, the communication interface 204 may include wireless capabilities, such as Bluetooth or IEEE 802.11 wireless interfaces and associated components. Other known wireless transmission protocols or wireless medium arrangements also can be employed. These interfaces may be used to transmit data, such as the user settings (e.g., tooth brushing settings) of one or more users. User settings may include settings relating to user of electric toothbrush 102 or users other than user of electric toothbrush 102, such as family members of user, friends of user, and others known by users, as described herein.

Oral care system 200 may include one more additional components. For example, a display 206 (e.g., digital display) may be placed on oral care system 200. The display 206 may display information relating to a user setting, such as a name of a user setting, a user's name in which the user setting is associated, a date associated with the user setting (e.g., such as when the user setting was uploaded/downloaded), the number of downloads associated with the user setting, instructions relating to the user setting, and the like. Display 206 may include light-emitting diode (LED) displays, an alphanumeric display screen, individual lights, or any other desired form of visual output. For example, display 206 may be an LED (or array thereof) that can be tuned to provide a desired luminescent characteristic such as color, temperature, intensity etc.

User profiles may be associated with a single user, multiple users, etc. For example, user of electric toothbrush 102 may generate a user profile for her use and/or for others to use. A user may receive user profiles associated with one or more users (e.g., other users) of the same or similar type of electric toothbrush 102. The other users may have an association with the user of electric toothbrush 102 (such as one or more family members of the user, dentists of the user, etc.), in examples. For example, a parent and/or a dentist may program and/or identify one or more user profiles for use by the user. The program may be a training program, for example, that demonstrates proper brushing techniques, brushing durations, and the like.

In other examples, the other users and the user of the electric toothbrush 102 may not have an association with one another. For example, other users may include celebrities (such as actors, professional athletes, musicians, etc.) that the user of the electric toothbrush 102 may know of. The user of electric toothbrush 102 may desire to perform oral care techniques similar to the other users. For example, the user of the electric toothbrush 102 may desire to brush her teeth similar to how a certain celebrity (e.g., famous person) brushers her teach, may desire to brush her teeth for the duration in which a celebrity brushers her teeth, etc. Performing similar brushing techniques may cause the user of the electric toothbrush 102 to feel connected to the celebrity, which may cause the user of the electric toothbrush 102 to brush more frequently and therefore provide hygienic benefits to the user of the electric toothbrush 102.

As described herein, users (such as the user of electric toothbrush 102 or other users of the same/similar type of electric toothbrush 102) may use a predefined setting for using the toothbrush. The predefined setting may be associated with a user profile, as described herein. Users (such as the user of electric toothbrush 102 or other users of the same/similar type of electric toothbrush 102) may define (e.g., generate) settings and/or user profiles for the toothbrush. Such user settings may be saved for later use and/or shared to one or more users of an electric toothbrush. The user profile (e.g., predefined or defined) may comprise an identity and/or may be associated with instructions for how the electric toothbrush 102 may operate. For example, instructions relating to the user profile may include the movements of the cleaning elements, movements of the head portion, durations for use, orders in which zones of the user's mouth (e.g., top, bottom, back, front) may be cleaned, etc.

User profiles and/or settings associated with a use of the electric toothbrush 102 may be provided to one or more users. User profiles may be associated with instructions for using the electric toothbrush 102. The user profiles (e.g., the instructions) may be uploaded from the one or more users (e.g., electric toothbrushes of one or more users) and downloadable by one or more other users (e.g., electric toothbrushes of one or more other users). For example, the instructions causing the cleaning elements to move in a predefined direction, speed, etc. may be uploaded from one user's electric toothbrush 102 to another user's electric toothbrush 102 and/or electronic device.

The electronic device may be a server (e.g., remote server), a mobile device of the other user, etc. In examples in which the user profile (e.g., instructions) are uploaded to a server (e.g., remote server), the user may download the instructions from the server. The user may directly download the instructions to the electric toothbrush 102, although in examples the user may also, or alternatively, download the instructions from the server to an electronic device (e.g., mobile device), and then download the instructions from the electronic device to the user's electric toothbrush 102. The electric toothbrush 102 may include one or more communication interfaces 204 for communicating with the server and/or electronic device, such as an antenna in the electric toothbrush 102 and/or charging device.

Figure 3:
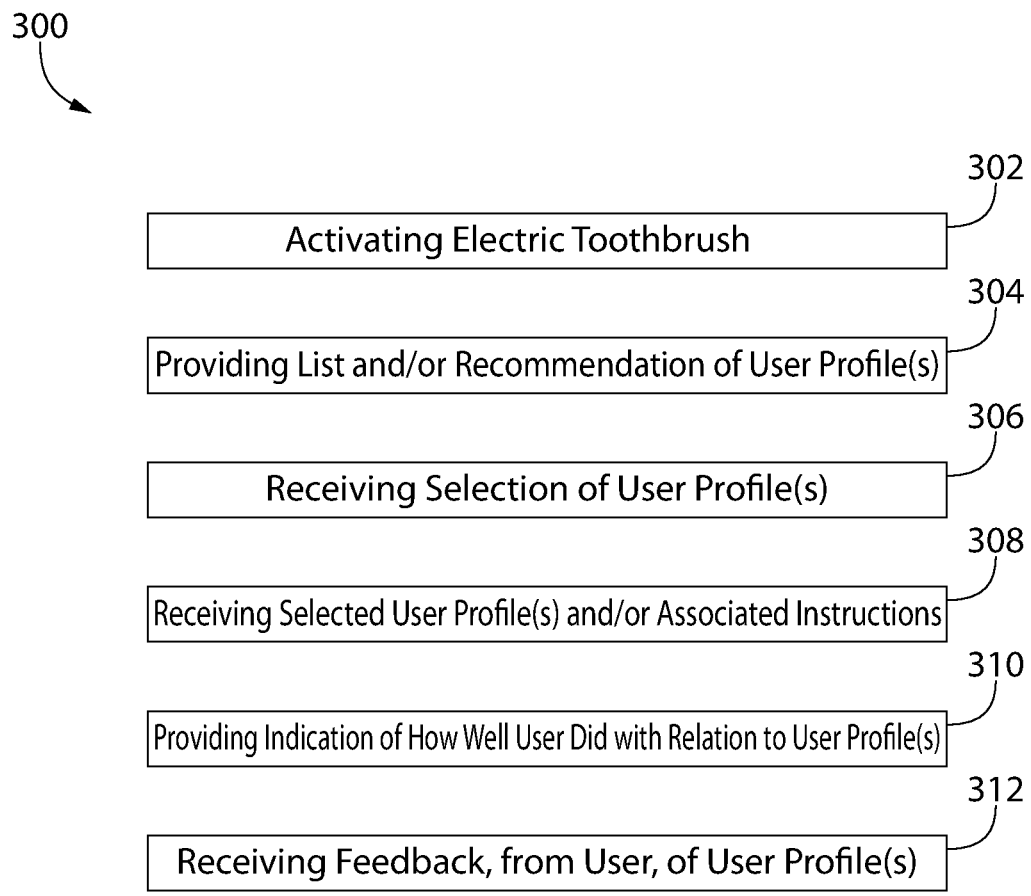
FIG. 3 is an example flow chart of using the personal care product, as described herein.

FIG. 3 shows an example method in which the electric toothbrush 102 may be used. Although the example below may describe the user receiving and/or providing user profile data with (e.g., only with) the electric toothbrush 102, it should be understood that this is for illustration purposes only. In examples, the user may receive and/or provide user profile data via one or more intermediary devices, such as via a mobile device and/or electric toothbrush 102. For example, the mobile device may act as an intermediary device between a server (such as server 250) and the electric toothbrush 102. In other examples, as provided below, the user may interface with the electric toothbrush 102, and the electric toothbrush 102 may interface (e.g., directly interface) with the server.

At 302, the user of the electric toothbrush 102 may activate the electric toothbrush 102. Upon activation, the electric toothbrush 102 may search for a user profile to perform brushing techniques. A user may perform brushing techniques based on a generic setting of the electric toothbrush 102, a setting defined by the user, and/or a setting defined by one or more other users of an electric toothbrush 102 that may of the same/similar type as the electric toothbrush 102 used by user.

For example, upon activating the electric toothbrush 102, the electric toothbrush 102 and/or the user of electric toothbrush 102 may search for a user profile having brushing techniques that the user would like to emulate in performing an oral care activity (such as brushing her teeth). At 304, the electric toothbrush 102 may provide a list and/or recommendation of a user profile (e.g., based on user profiles trending, a previously used user profile, etc.), in examples.

The user of electric toothbrush 102 may select one or more of the user profiles provided (e.g., recommended) by the electric toothbrush 102. In other examples the user may perform a search of a user profile. For example, the user may perform search (e.g., via electric toothbrush 102) for a celebrity in which the user would like to emulate in performing an oral care activity.

The user and the electric toothbrush 102 may communicate with one another in one or more ways. For example, the electric toothbrush 102 may provide video (via display 206) or audio (via speaker 122) information to the user in which the information relates to one or more user profiles. The electric toothbrush 102, for example, may provide a list via display 206 or speaker 122 of the top user profiles being downloaded to electric toothbrushes, the most effective user profiles (e.g., most effective in fighting cavities, tooth decay, and the like), user profiles of a certain group (e.g., actors, athletes, musicians), etc. The list may be grouped according to demographics. For example, the list may be grouped and/or ordered according to locations of users, ages of users, dental specifics (e.g., users having braces), etc.

Electric toothbrush 102 may provide trending information, such as what user profiles are most popular (e.g., popular at the moment, previously popular, expected to be popular), which user profiles are losing popularity, etc. The electric toothbrush 200 may provide information relating to the user profiles, such as the person(s) who are associated with the user profile, how long the person has been performing oral care techniques consistent with the user profile, the oral care successes the user has achieved via since performing the oral care techniques, etc. For example, the user profile may indicate that the user(s) of the user profile has exhibited less cavities since performing oral care techniques consistent with the instructions provided in the user profile.

At 306, the user may select the desired user profile. The user may select the user profile via a touch, audibly, and the like. For example, user of electric toothbrush 102 may select the user profile via a touch on display 206 (in examples in which display 206 is a touch screen), a touch on hard buttons located on electric toothbrush 102, via speaking into microphone 124, and the like. The user may select the user profile for a single use, for multiple uses (e.g., for the next 7 days), etc.

In examples, one or more user profiles may be selectable by the user. For example, the user may choose a user profile of a famous actor and a user profile of a famous athlete. When two or more user profiles are selected, instructions relating to each of the user profiles may be performed at a single time each (e.g., one user profile performed in the morning and the other user profile performed in the evening). In other examples instructions associated with two or more user profiles may be combined and/or mixed to create a new user profile (e.g., a hybrid user profile) having instructions from each of the user profiles.

The electric toothbrush 102 may perform a determination of how instructions of each user profile may be used to create a hybrid user profile. For example, the electric toothbrush 102 may define a user profile having instructions appropriate for the user of electric toothbrush 102 based on an oral care profile of the user (such as the age, dental health, dental history, and/or brush activity). In other examples the user may select instructions from one or more user profiles to generate a user profile in which the user determines is appropriate for the user.

At 308, the electric toothbrush 102 may receive the desired user profile and/or associated instructions. For example, the electric toothbrush 102 may download the selected user profile and/or associated instructions, although in examples the electric toothbrush 102 may already have stored (in memory 220) one or more user profiles selected by the user (e.g., previously selected by the user or determined by electric toothbrush 102 to be desired by the user of electric toothbrush 102). As described herein, the user profile may be associated with instructions for performing oral care techniques via the electric toothbrush 102.

The instructions may be actions that one or more portions (e.g., cleaning elements 107) of the electric toothbrush 102 take when used by the user of electric toothbrush 102. The actions may include, for example, cleaning element moving at a predefined speed, cleaning element moving in a predefined direction, brush head 106 moving in a predefined direction, indications to the user of which zone of the user's oral cavity should be addressed (e.g., brushed), indications to the user of how long each zone of the user's cavity should be addressed, and the like.

As described herein, processor 202 may cause electric toothbrush 102 (components of electric toothbrush 102) to perform one or more movements. Electric toothbrush 102 may perform one or more of the activities automatically in examples, although user input may be required to enable electric toothbrush 102 to perform one or more activities. For example, processor 202 may cause (e.g., automatically cause) cleaning elements 107 of electric toothbrush 102 to move at a predefined speed and/or in a predefined direction at a time, based on the selected user profile. In other examples, a user selection (via touch or voice) may be required before processor 202 causes cleaning elements 107 of electric toothbrush 102 to move at a predefined speed and/or in a predefined direction.

The electric toothbrush 102 (e.g., processor 202) may terminate (e.g., turn off) the oral care techniques provided by the user profile. At 310, the electric toothbrush 102 may provide an indication of how well the user performed with relation to the user profile (e.g., instructions provided by the user profile). The indication may be based on a comparison of the techniques performed by the user of electric toothbrush 102 and the techniques provided by the instructions of the user profile. For example, the electric toothbrush 102 may provide an indication that the user has performed close to the instructions defined by the user profile, exactly as the user profile defines, and poorly with respect to the instructions defined by the user profile. In examples, the electric toothbrush 102 may provide a score of how closely the user performed with respect to the instructions defined by the user profile. For example, the electric toothbrush 102 may provide an indication (e.g., audio or video indication) that the user performed similarly (e.g., 90% accuracy) to the user profile in total duration of brushing, but the user did not perform similarly (e.g., 45% accuracy) to the user profile in brushing her top, back teeth. By providing such indications, the user can set future goals for achieving similar brushing techniques as those defined by the user profile.

At 312, the user may provide feedback of the user profile. The feedback may be provided via touch (e.g., through display 206) on the electric toothbrush 102, audibly (e.g., via microphone 124) to the electric toothbrush 102, via mobile device 270, and the like. For example, the user may indicate that they believe the user profile was effective, fun, boring, effective, noneffective, too long, too short, focused on one or more zones of the user's cavity more than others, etc. The electric toothbrush 102 may transmit such feedback to the server, and the feedback may be aggregated for determination of ratings (good or poor), improvements for the user profile, discontinuation of the user profile, etc.

Based on the feedback, the electric toothbrush 102 may perform updates to the user profile (e.g., instructions associated with the user profile). For example, if a predetermined percentage of users indicate that the duration of a brushing zone of a user profile is too short, the duration of the user profile may be increased. The users may be informed of such updates, in some examples, although in other examples the updates to the user profile may be performed without the users being informed. In examples in which the user profile is updated based on user feedback, the user providing such feedback may be recognized for the improvement to the user profile. For example, the name of the user may be associated with the user profile, the user may receive rewards (such as a free electric toothbrush or other oral care products), and the like.

While the inventions have been described with respect to specific examples including presently preferred modes of carrying out the inventions, those skilled in the art will appreciate that there are numerous variations and permutations of the above described systems and techniques. It is noted that common components such as memory devices and power sources are not discussed herein, as their role would be easily understood by those of ordinary skill in the art. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A personal care product comprising:
   a treatment portion;
   a handle portion for gripping the personal care product;
   a communication interface configured to receive signals from one or more digital devices, the received signals comprising one or more user profiles, wherein the one or more user profiles relate to users other than a user of the personal care product;
   a display configured to:
      display at least some of the one or more user profiles, the one or more user profiles comprising:
         an identity of a user associated with each of the one or more user profiles; and
         instructions for operating the personal care product corresponding to the each of the one or more user profiles; and
      receive a user selection corresponding to at least a first user profile of the one or more user profiles; and
   a processor configured to receive the first user profile from the communication interface and cause the personal care product to perform operations according to the instructions of the first user profile.

2. The personal care product of claim 1 wherein the one or more user profiles relating to users other than the user of the personal care product have an association with the user of the personal care product.

3. The personal care product of claim 1 wherein the users other than the user of the personal care product comprise at least one of a famous actor, athlete, or musician.

4. The personal care product of claim 1 wherein the instructions for operating the personal care product relate to at least one of a speed in which cleaning elements of the personal care product move, a direction in which the cleaning elements move, a duration for which the cleaning elements move in an oral cavity of the user, or an order in which zones of the oral cavity of the user are to be cleaned.

5. The personal care product of claim 1 wherein the processor is further configured to search for the one or more user profiles based on input provided by the user of the personal care product.

6. The personal care product of claim 1 wherein the processor is further configured to cause recommendations of the one or more user profiles to be provided based on a popularity of the one or more user profiles.

7. The personal care product of claim 1 wherein the processor is further configured to cause a score to be provided of how closely the user of the personal care product performed with respect to the instructions of the user profile.

8. The personal care product of claim 1, further comprising:
   the display configured to display information relating to the one or more user profiles, the displayed information comprising at least one of a number of downloads of each of the one or more user profiles or a date on which each of the one or more user profiles was downloaded by the personal care product.

9. The personal care product of claim 1, wherein the personal care product is an electric toothbrush.

10. A system for enhancing a personal care experience comprising:
    one or more digital devices configured to:
       receive a user profile uploaded by a third-party user that is different from the user of the system, the user profile comprising an identity of the third-party user and instructions for operating a personal care product; and
       provide signals comprising the user profile; and
    the personal care product comprising:
       a treatment portion;
       a handle portion for gripping the personal care product;
       a communication interface configured to receive the signals from the one or more digital devices; and
       a processor configured to receive the user profile from the communication interface and cause the personal care product to perform operations according to the instructions of the user profile.

11. The system of claim 10 wherein the user profile relating to the third-party user has an association with the user of the system.

12. The system of claim 10 wherein the third-party user comprises at least one of a famous actor, athlete, or musician.

13. The system of claim 10 wherein the instructions for operating the personal care product relate to at least one of a speed in which cleaning elements of the personal care product move, a direction in which the cleaning elements move, a duration for which the cleaning elements move in an oral cavity of the user, or an order in which zones of the oral cavity of the user are to be cleaned.

14. The system of claim 10 wherein the processor is further configured to cause a score to be provided of how closely the user of the system performed with respect to the instructions of the user profile.

15. The system of claim 10 wherein the personal care product is an electric toothbrush.

16. A computer-implemented method of using a personal care product comprising:
    activating the personal care product based on a first input provided by a user;
    displaying one or more user profiles comprising instructions for operating the personal care product;

receiving, via a second input provided by the user, a selection of a first user profile of the one or more user profiles;

receiving, via a communication interface of the personal care product, digital information from one or more digital devices, the digital information comprising the first user profile of the user profiles; and causing, via a processor, the personal care product to perform operations according to the instructions of the first user profile.

17. The method of claim 16 wherein the second input comprises at least one of a touch provided by the user or an audio signal provided by the user.

18. The method of claim 16 wherein the one or more user profiles relate to a user other than the user of the personal care product.

19. The method of claim 16 wherein the instructions comprise at least one of a speed of cleaning elements of the personal care product, a direction of the cleaning elements, a duration for use in a zone of an oral cavity of the user of the personal care product, or an order in which zones of the oral cavity of the user is to be cleaned.

20. The method of claim 16 wherein the personal care product is an electric toothbrush.

* * * * *